United States Patent
McGill et al.

(10) Patent No.: US 6,406,248 B1
(45) Date of Patent: Jun. 18, 2002

(54) APPARATUS FOR LIFTING AND MOVING AN UPRIGHT CYLINDRICAL CONTAINER

(76) Inventors: Dennis E. McGill, 1701 Hardy Dr., Edmond, OK (US) 73013; Billy J. Lucas, 16520 E. Memorial Rd., Luther, OK (US) 73054

(*) Notice: Subject to any disclaimer, the term of this patent is extended or adjusted under 35 U.S.C. 154(b) by 0 days.

(21) Appl. No.: 09/728,394

(22) Filed: Dec. 4, 2000

(51) Int. Cl.[7] ................................................. B60P 1/00
(52) U.S. Cl. ....................... 414/634; 280/47.2; 414/619; 414/448
(58) Field of Search ................................ 414/589, 590, 414/619, 630, 631, 632, 634, 635, 636, 637, 638, 460, 910, 911, 444, 490, 448; 254/3 R, 3 C, 2 R; 280/47.17, 47.2

(56) References Cited

U.S. PATENT DOCUMENTS

| | | | | |
|---|---|---|---|---|
| 2,598,489 A | * | 5/1952 | Bayer et al. ................. | 414/448 |
| 4,536,123 A | * | 8/1985 | Snyder ........................ | 414/448 |
| 4,728,245 A | * | 3/1988 | Shelton ....................... | 414/490 |
| 4,944,648 A | * | 7/1990 | Parr ........................ | 414/490 X |
| 5,122,027 A | | 6/1992 | Tabayashi ................... | 414/622 |
| 5,379,814 A | | 1/1995 | Posly ......................... | 141/351 |
| 5,489,183 A | * | 2/1996 | Malden et al. .............. | 414/490 |
| 5,618,154 A | | 4/1997 | Irons, Jr. et al. ............ | 414/622 |
| 5,647,720 A | * | 7/1997 | Golicz et al. ................ | 414/490 |
| 5,944,474 A | | 8/1999 | Cummins et al. ........... | 414/621 |

FOREIGN PATENT DOCUMENTS

BE 565537 * 3/1958 ................. 414/635

* cited by examiner

Primary Examiner—Frank E. Werner
(74) Attorney, Agent, or Firm—Dunlap, Codding & Rogers, P.C.

(57) ABSTRACT

A work load lifting and moving apparatus is formed by a wheel supported horizontal main frame in turn supporting a mast assembly having a vertically reciprocal lifting frame gripping and lifting the work load by a hoist supported by the mast assembly. Other lifting apparatus supported by the main frame tilts the vertical axis of the work load in a forward direction.

4 Claims, 5 Drawing Sheets

APPARATUS FOR LIFTING AND MOVING AN UPRIGHT CYLINDRICAL CONTAINER

CROSS REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to plumbing equipment and more particularly to an apparatus for lifting and placing a water heater on a stand.

This invention eliminates the necessity of multiple manpower for moving such a water heater by a mechanical apparatus which grasps the water heater, lifts and easily moves it for installation in a elevated position by a single workman.

1. Field of the Invention

Local codes usually require water heaters, particularly those installed in garages or the like, have the base or bottom end of the heater elevated and supported on a stand at least 45.72 cm (18") inches above the surface of the surrounding a generally horizontal floor. Since many of these water heaters are of considerable size, varying diametrically and longitudinally and generally cylindrical, when a 189 L (50 gal) or greater volume water heater must be elevated it requires more than one workman to lift the water heater into place.

2. Description of the Prior Art

The prior art discloses a number of United States patents which lift and move cylindrical containers from one location to another for example, U.S. Pat. No. 5,379,814 issued Jan. 10, 1995 to Posly for Water Bottle Lifting Mechanism. This patent discloses a mechanism which lifts a bottle of water from a lower upright position to an elevated position during which a cam mechanism rotates the water bottle from an upright position to an inverted water discharging position. Also, U.S. Pat. No. 5,618,154 issued Apr. 8, 1997 to Irons, Jr. et al. for Drum Transporter discloses a main frame mounted on wheels supporting a mast assembly extending horizontally from the main frame. An outer mast assembly includes a pair of legs which diverge from each other for straddling a pallet supporting a drum to be moved. A post extends upwardly from the main frame and includes a fixed guide post having an upward clamping mechanism for releasably engaging a drum chime to support the drum on a lower drum lifting support permitting the lifting mechanism to lift and move the drum from one location to another and minimize a tendency of the transporter to tip the drum during the handling movement thereof.

U.S. Pat. No. 5,122,027 issued Jun. 16, 1992 to Tabayashi for Carrier For Containers and U.S. Pat. No. 5,944,474 issued Aug. 31, 1999 to Cummins et al. for Support For A Cylindrical Container are believed good examples of the further state-of-the-art.

These two patents generally disclose horizontal wheel supported base frames which support upright members and for lifting cylindrical containers from one place to another.

This invention is believed distinctive over the above named patents by providing a wheel supported lifting apparatus for moving an upright container by initially lifting and moving it to a position for installation where the container and apparatus may be tilted in a forward direction to insert the upper end of the lifted container into an overhead opening and position the depending end of the container on a stand elevated above a generally horizontal support surface.

BRIEF SUMMARY OF THE INVENTION

A horizontally disposed U-shaped frame is wheel supported for movement across a substantially level supporting surface. A mast is pivotally connected at its depending end with the bight portion of the U-shaped frame for forward tilting movement of the mast about a horizontal axis. A lift frame assembly comprising upper and lower pairs of parallel arms straddling opposite sides of the mast, interconnected in vertically spaced relation by stringers, support upper and lower pairs of bearings respectively contacting forward and rearward sides of the mast for vertical movement of the lift frame assembly, relative to the mast. The arms project forwardly of the mast and respectively support an upper and lower pair of part circular members which cooperatively engage vertically spaced peripheral portions of respective end portions of the cylindrical member to be lifted and moved.

A conventional hand crank winch or hoist means removably connected with the rearward surface of the mast between the upper and lower parallel arms is connected by a flexible band with the lowermost pair of lift frame arms for raising and lowering the lift frame and water heater or work load, relative to the mast. A lifted cylindrical member is held in position adjacent the part circular support arms by a conventional ratchet tie down flexible band clamp means mounted on the lift frame assembly strap members and project forwardly of the mast.

A crank operated screw jack means, mounted on the bight portion of the base frame, is connected with a rearward base end extension of the mast for tilting the latter forwardly, including the lifted cylindrical member, in a forward tilting action of the lift frame means and mast to position the cylindrical member upward end portion in a ceiling opening when positioning the cylindrical container on an elevated stand. Rear wheels on the base permit movement of the apparatus in two wheel dolly fashion.

The principal object of this invention is to provide a lifting apparatus for lifting and moving a residential type water heater and placing the later in an elevated position relative to a generally horizontal supporting surface.

DETAILED DESCRIPTION OF THE INVENTION

Figure 1:
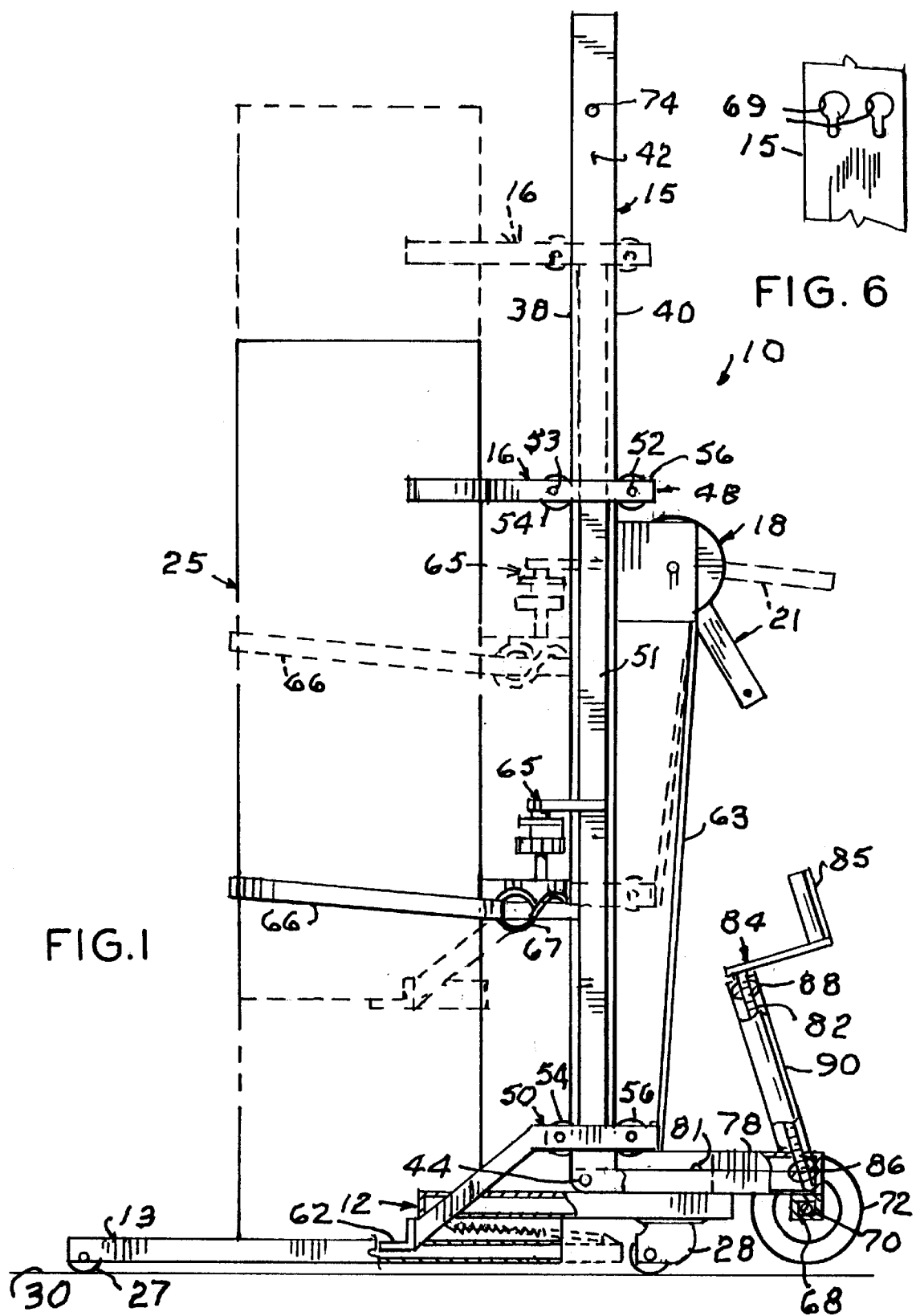
FIG. 1 is a side elevational view of the apparatus, with parts removed and broken away for clarity and illustrating, by dash lines, a lifted water heater.

The reference numeral 10 indicates an apparatus as a whole comprising a base frame means 12.

The base frame means 12 includes a generally U-shaped forward portion having telescoping legs 13 for straddling a work load and a bight portion 14 centrally supporting an L-shaped mast 15.

Figure 2:
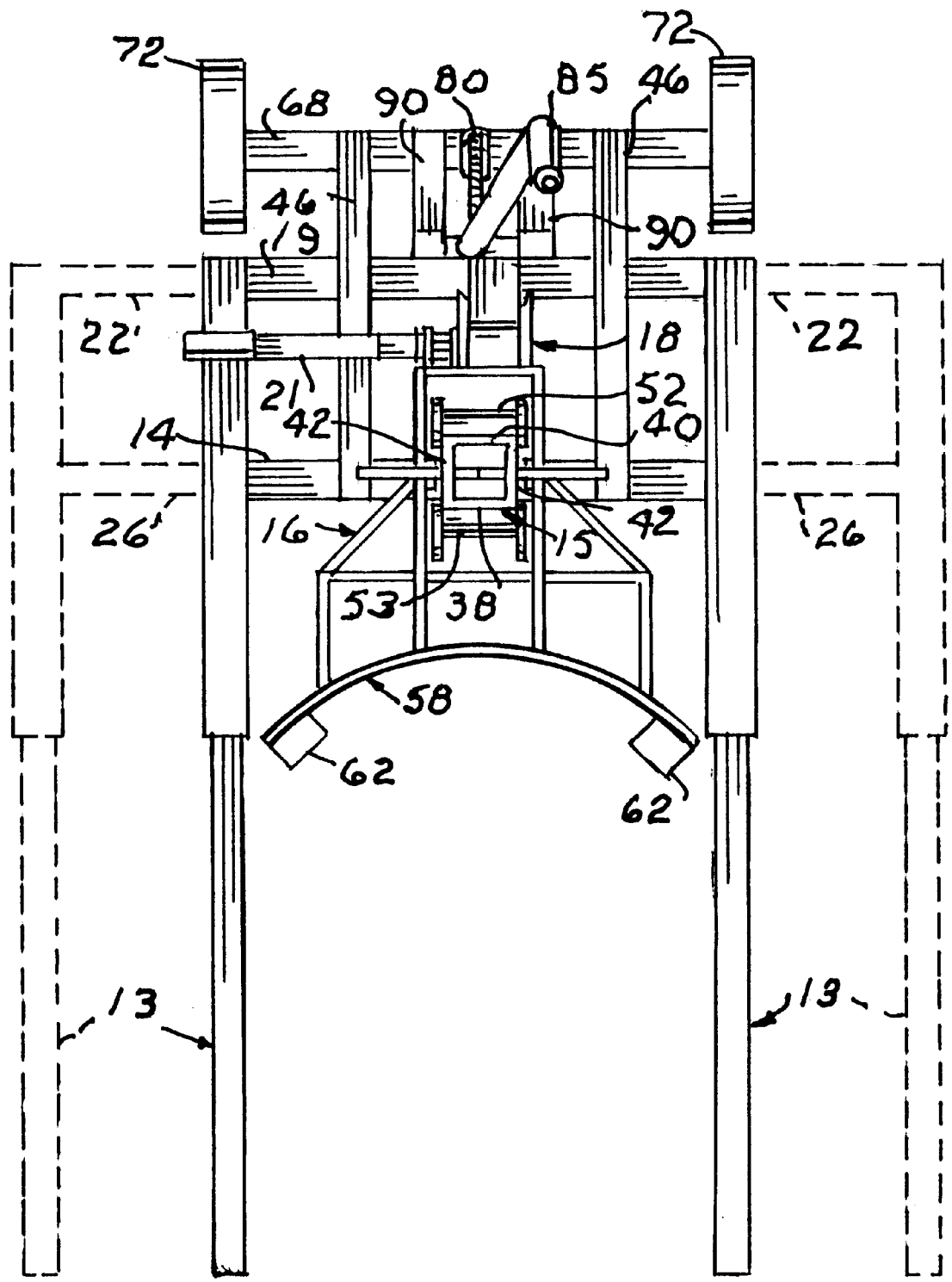
FIG. 2 is a top view to an enlarged scale illustrating, by dash lines, lateral expansion of the base frame.

The telescoping legs 13 extend rearwardly beyond the bight portion 14 and are connected with a cross member 19 parallel with the bight portion 14. The telescoping legs 13 are provided with lateral confronting stub legs 20 and 22, which are respectively telescopically received by the bight portion 14 and cross member 19 (FIG. 2) to expand the effective width of the base frame means 12 for additional stability and to envelope opposing sides of an immovable object when positioning a water heater, indicated as 25 on a stand, not shown.

The base frame means 12 further includes a pair of forward wheels 27 (FIG. 1) journaled by the respective forward end portion of the telescoping legs 13 and a pair of rearward frame steering casters 28 depending from respective end portions of the telescoping legs 13 between the bight portion 14 and the cross member 19, thus permitting the base frame means 12 to be easily moved across a generally horizontal supporting surface, such as a floor 30.

Figure 3:
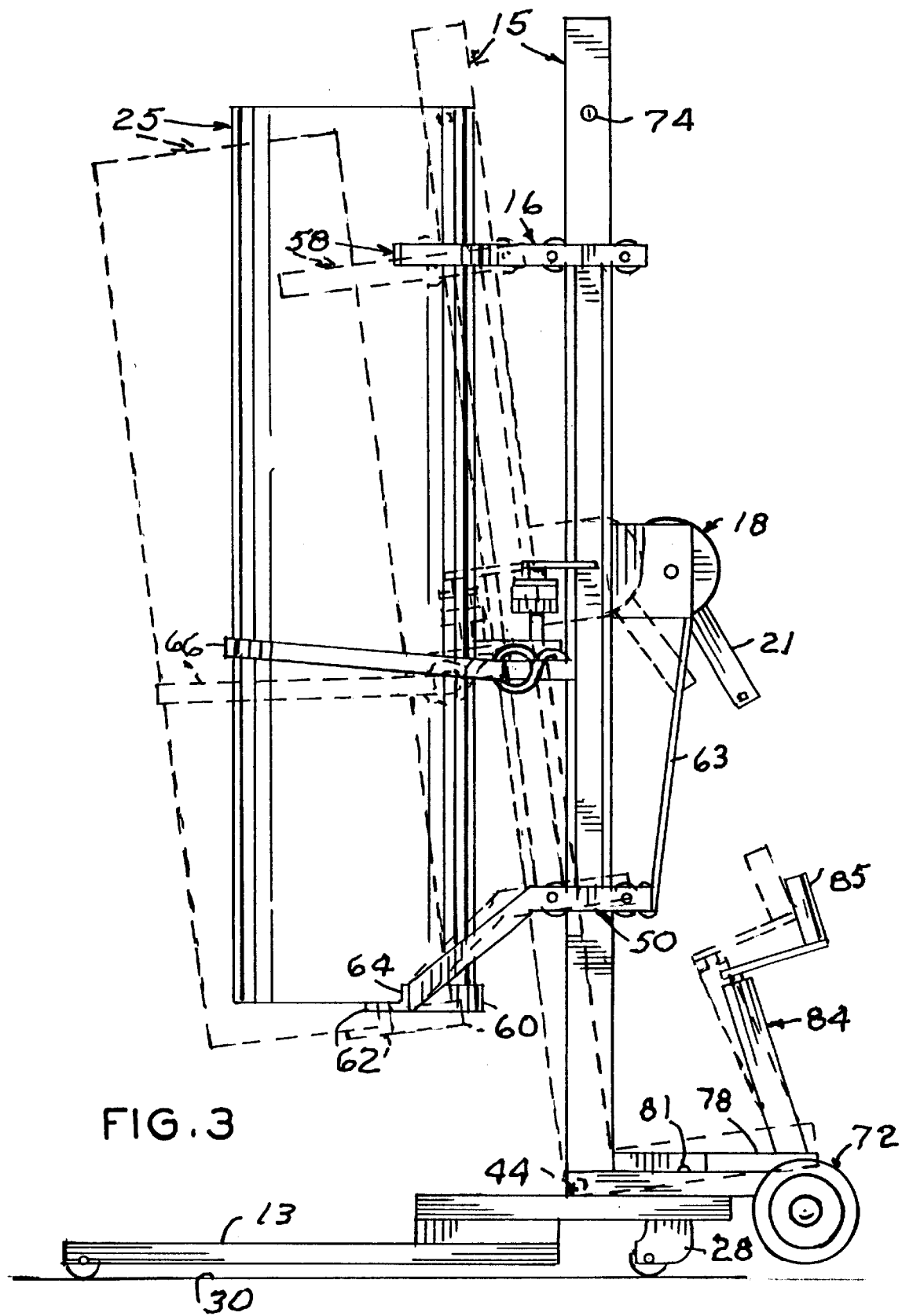
FIG. 3 is a side view similar to FIG. 1 illustrating, by dash lines, forward tilting movement of the apparatus and the water heater.

The L-shaped mast 15 is preferably tubular formed from box channel tubing to provide forward, rearward, and parallel side surfaces 38, 40 and 42, respectively. The L-shaped mast 15 is mounted on the base frame means 12 by a hinge pin 44 between a pair of stringers 46 extending between and overlying the bight portion 14 and cross member 19 permitting a forward tilting movement of the L-shaped mast 15 and other components, as illustrated by dash lines (FIGS. 3).

A lift frame means 16 is vertically reciprocal on the L-shaped mast 15 by a winch or hoist means 18 having a crank arm 21 supported by the L-shaped mast 15 and operatively connected with the lift frame means 16, as presently explained. The lift frame means 16 comprises upper and lower pairs of parallel arms 48 and 50, connected in vertically spaced relation by strap members 51, which straddle the parallel side surface 42 of the L-shaped mast 15 and are disposed in slidable relation with respect to the forward side surface 38 and the rearward side surface 50 of the L-shaped mast 15 by pairs of stub axles 52 and 53, respectively journaling upper and lower pairs of bearings 54 and 56, respectively.

One end portion of the upper pair of parallel arms 48 are extended forwardly and respectively secured to a part circular portion 58 for contact with a peripheral portion of the upper end portion of the water heater 25. Similarly, the lower pair of parallel arms 50 are extended forward and downwardly and connected with a part circular portion 60 (FIG. 3) having an L-shaped foot portion 62 at respective ends forming a water heater supporting lip and a leg 64 of the L-shape describing a stub wall nesting a peripheral portion of the water heater wall. The part circular portion 60 is in cooperative vertical alignment with the part circular portion 58 of the upper pair of parallel arms 48.

A conventional ratchet tie down band clamp means 65 is connected with the strap members 51 intermediate their ends and adjacent the forward surface of the L-shaped mast 15 and includes a flexible band 66 which surrounds an intermediate portion of the water heater 25 to impinge it with the part circular portions 58 and 60.

The conventional hand crank winch or hoist means 18, is removably connected with the rearward side surface 40 of the L-shaped mast 15 between the upper and lower pairs of parallel arms 48 and 50, respectively, and is connected, by a flexible band 63, with the lower pair of parallel arms 50 for raising and lowering the lift frame means 16 and the water heater 25, as a unit, relative to the L-shaped mast 15. FIG. 6 illustrates a pair of keyhole slots 69 in the rearward side surface 40 of the L-shaped mast 15 which removably receives mounting bolts, not shown, on the frame of the hoist means 18.

An axle housing 68 is transversely connected to the rearward end portions of the base frame stringers 46 and support an axle 70 which journals a pair of wheels 72, with the periphery of the wheels normally in spaced relation with respect to a supporting surface, such as the floor 30.

Figure 4:
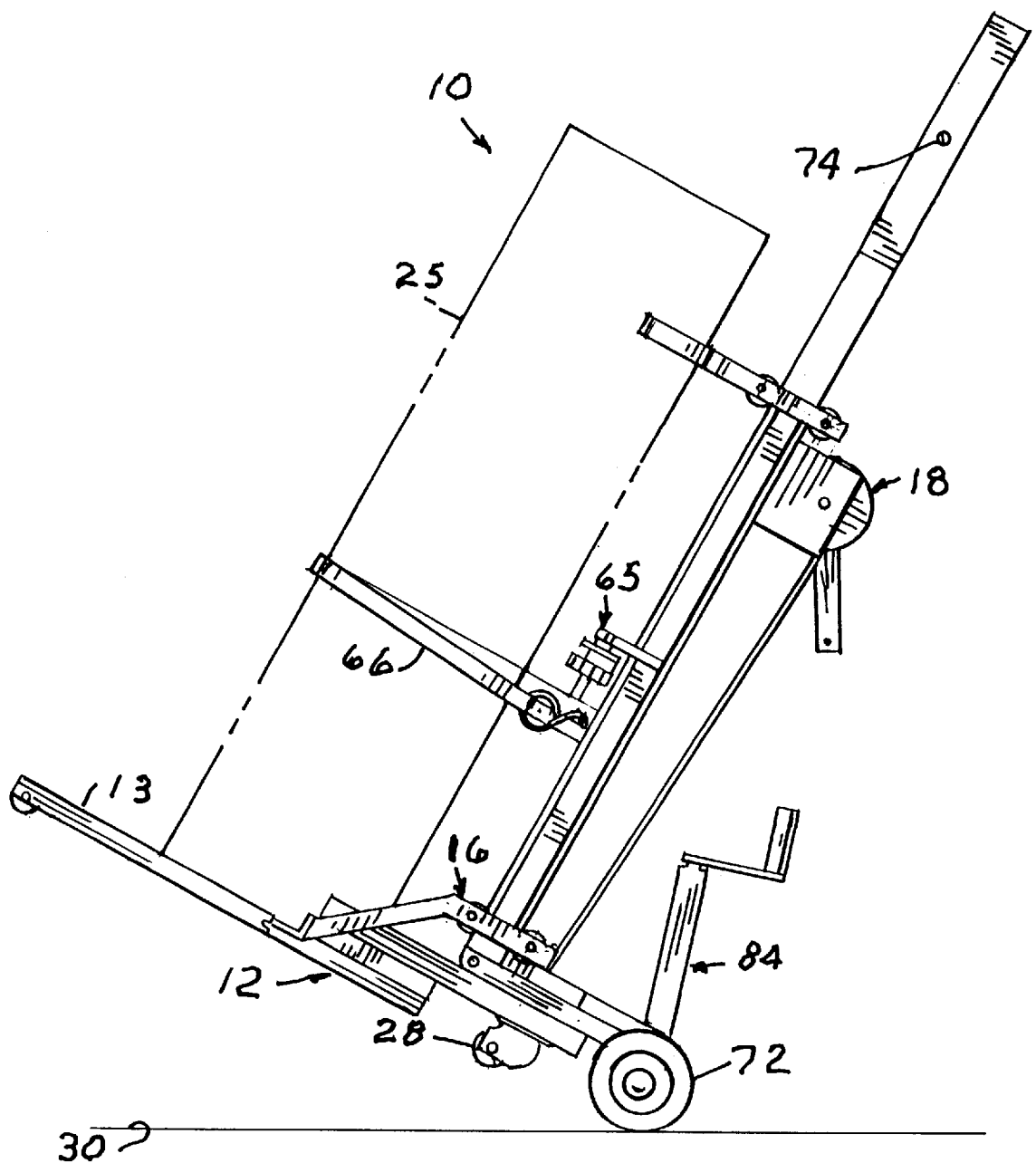
FIG. 4 is side elevational view, on a reduced scale, illustrating the apparatus in two wheel dolly position.

A stub handle 74 projects from opposite sides of the upper end portion of the L-shaped mast 15. The purpose of the handles 74 and wheels 72 is for manually tilting the L-shaped mast 15 and assembled components in a rearward direction until the pair of wheels 72 contact the floor 30 permitting the entire apparatus 10 to be moved in two wheel dolly fashion (FIG. 4) from one location to another, either per se or while supporting a water tank or other cylindrical work load.

The depending portion of the L-shaped mast 15 is provided with a rearwardly projecting orthogonal foot portion 76 (FIG. 1) which is telescopically inserted into a sleeve 78 supported at its rearward end portion by the axle housing 68 and provided with an upwardly open slot 80 (FIG. 2) in its rearward top surface for receiving the depending end portion of a screw 82 of a crank operated screw jack means 84. The depending end portion of the screw 82 is threadedly engaged with an anchor 86 journaled at its respective ends by the sleeve 78 with a top end of the screw 82 similarly secured to a cross head 88 journaled by and between a pair of standards 90 rigidly mounted at their depending ends on the top surface of the axle housing 68, adjacent opposite sides of the sleeve 78 and inclined upward and forwardly. The crank operated screw jack means 84 normally maintains the L-shaped mast 15 upright and manual angular rotation of a screw jack handle 85 in one direction progressively lifts the sleeve 78 and the rearwardly projecting orthogonal foot portion 76 of the L-shaped mast 15 to tilt the L-shaped mast 15 and lift frame means 16, (and water heater, if connected) in a forward tilting action as illustrated by dash lines (FIG. 3).

OPERATION

In operation, assuming the apparatus 10 has been constructed and assembled as described hereinabove, the apparatus 10 is manually moved over a floor 30 to the position of the water heater 25 to be lifted. The telescoping legs 13 are disposed on opposing sides of the water heater 25 and with the lift frame means 16 in a lowered position, the part circular portions 58 and 60 are disposed adjacent a peripheral portion of the water heater 25 which is manually tilted in a direction opposite the apparatus 10 while the later is moved toward the water heater 25 so that a portion of the bottom edge of the water heater 25 rests on the L-shaped foot portion 62. The flexible band 66 of the conventional ratchet tie down band clamp means 65 surrounds a peripheral portion of the water heater 25 and is secured by a hook 67 at its free end to the structure containing the remainder of the flexible band 66. The sprocket wheel of the conventional ratchet tie down band clamp means 65 is manually rotated in a conventional manner so that the flexible band 66 firmly impinges the water heater 25 against the part circular portions 58 and 60. Thereafter the water heater 25 is moved with the apparatus 10 to a place for installation.

The crank of the hoist means 18 is in manually angularly rotated to wind the flexible band 63 on the hoist drum, thus lifting the water heater 25 to a desired elevated position, as illustrated by dash lines (FIG. 1). The water heater 25 is initially disposed with a major portion of its bottom surface resting on a stand or platform (not shown) to receive the water heater 25. The flexible ratchet band 66 is released and the water heater 25 positioned at its permanent location and the apparatus 10 moved rearwardly from the position of the water heater 25, thus completing a normal cycle of operation of the apparatus 10.

Figure 5:
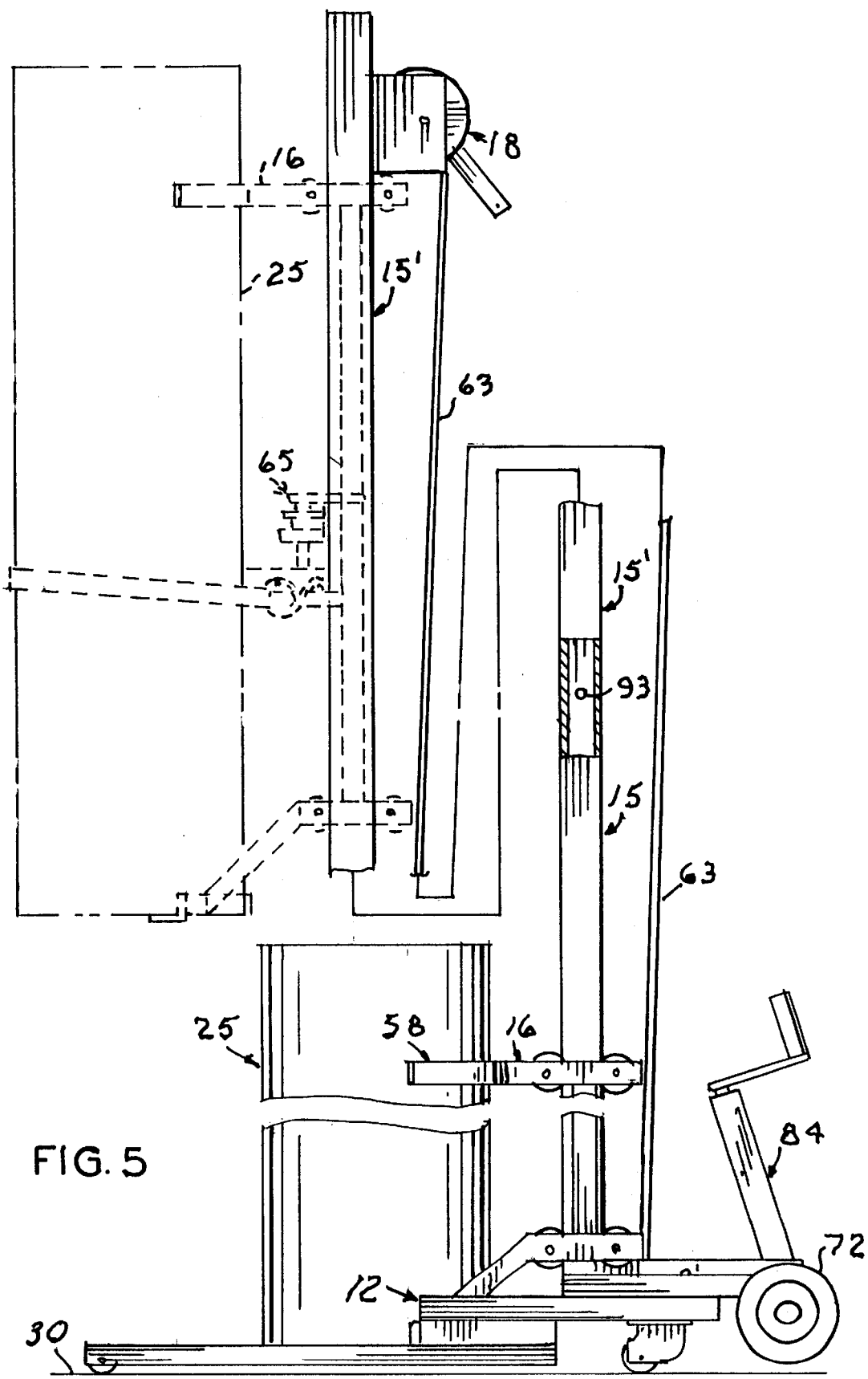
FIG. 5 is a side fragmentary elevational view similar to FIG. 1 illustrating a mast extension; and, FIG. 6 is a fragmentary elevational view of the mast hoist mounting position.

FIG. 5 illustrates an alternative embodiment particularly useful for installing the water heater 25 in an attic portion of a residential dwelling. This embodiment includes a mast extension 15' of equal or greater length than the L-shaped mast 15 to extend the working height available for the lift frame means 16 in moving the water heater 25 vertically into a space above the ceiling of a conventional residential dwelling. To accomplish this the handles 74 (FIG. 1) are removed from the L-shaped mast 15 and the mast extension 15' is provided with a reduced end portion 83 which is telescopically received by the end portion of the L-shaped mast 15 opposite the base means 12. A pair of spring urged pins 93 supported by the mast extension 15' engage the apertures normally receiving the handles 74 (FIG. 1) to lock the mast extension 15' in axial alignment with the L-shaped mast 15. The hoist means 18 is moved from its normal position on the L-shaped mast 15 and similarly attached to the mast extension 15' upper end portion, thus permitting the band 63 of the hoist means 18 to lift the water heater 25 to a desired elevated position.

The apparatus 10 may be folded, for shipping or storage, which is accomplished by manually rotating the jack screw 82 to tilt the L-shaped mast 15 in a forward direction, as described hereinabove for the forward tilting of the apparatus 10, and manually releasing the sleeve 78 from the rearwardly projecting orthogonal foot portion 76 of the L-shaped mast 15 by manually releasing spring urged pins 81 on opposite sides of the sleeve 78 so that the rearwardly projecting orthogonal portion 76 may be withdrawn from the sleeve 78 as the two are disposed angularly upward toward each other. This permits the L-shaped mast 15 and its components to be tilted toward a horizontal position until the L-shaped mast 15 is substantially parallel with the longitudinal axis of the telescoping legs 13.

What is claimed is:

1. A lifting, moving and tilting apparatus for a cylindrical work load, comprising:

base frame means having a forward work load straddling end and a rearward steering end;

wheel means journaled by and depending from said base frame means for movement from one location to another;

mast means including an L-shaped mast having a foot portion pivotally mounted on said base frame means and having a leg portion projecting vertically upward from a central portion of said base frame for vertical forward tilting movement about a horizontal axis;

screw jack means mounted on a rearward end portion of said base frame means and connected with a depending end portion of said mast assembly for forward tilting of said mast assembly;

lifting frame means having vertically spaced work load engaging arms vertically slidable on said mast leg portion;

work load band clamp means mounted on said lifting frame means for impinging the work load against said arms; and, hoist means mounted on the mast assembly and connected with the lifting frame means for raising and lowering a work load.

2. The apparatus according to claim 1 in which pairs of lifting frame arms straddle opposite sides of said mast and further include:

bearing means transversely supported by said arms for frictional contact with forward and rearward surfaces of said mast; and, a part circular work load contacting member extending between and connected with the respective said pairs of arms forwardly of said mast.

3. The apparatus according to claim 2 and further including:

work load supporting lips on the lower most part circular member.

4. The apparatus according to claim 2 in which the wheel means includes:

a pair of caster wheels under the rearward end portion of said base frame means; and, a pair of auxiliary wheels operatively supported by said base frame means rearward end portion and normally out of contact with a supporting surface for supporting the apparatus in two wheel dolly fashion when a vertical axis of the mast is tilted rearwardly.

* * * * *